(12) United States Patent
Yamashita et al.

(10) Patent No.: US 9,551,237 B2
(45) Date of Patent: Jan. 24, 2017

(54) VEHICULAR FLUID POWER TRANSMITTING DEVICE

(71) Applicants: Toshiya Yamashita, Toyota (JP); Naoki Itazu, Nagoya (JP); Yoichi Nakashima, Nissin (JP); Takashi Hori, Anjo (JP); Masaru Ebata, Chita-shi (JP); Yasunori Doman, Hirakata (JP)

(72) Inventors: Toshiya Yamashita, Toyota (JP); Naoki Itazu, Nagoya (JP); Yoichi Nakashima, Nissin (JP); Takashi Hori, Anjo (JP); Masaru Ebata, Chita-shi (JP); Yasunori Doman, Hirakata (JP)

(73) Assignees: TOYOTA JIDOSHA KABUSHIKI KAISHA, Toyota-shi, Aichi-ken (JP); AISIN AW CO., LTD., Anjo-shi, Aichi-ken (JP); EXEDY CORPORATION, Neyagawa-shi, Osaka (JP)

( * ) Notice: Subject to any disclaimer, the term of this patent is extended or adjusted under 35 U.S.C. 154(b) by 474 days.

(21) Appl. No.: 14/348,124

(22) PCT Filed: Sep. 25, 2012

(86) PCT No.: PCT/IB2012/001864
§ 371 (c)(1),
(2) Date: Mar. 28, 2014

(87) PCT Pub. No.: WO2013/045994
PCT Pub. Date: Apr. 4, 2013

(65) Prior Publication Data
US 2014/0255163 A1 Sep. 11, 2014

(30) Foreign Application Priority Data
Sep. 29, 2011 (JP) .................................. 2011-214878

(51) Int. Cl.
*F01D 25/24* (2006.01)
*F16H 45/02* (2006.01)
*F16H 41/24* (2006.01)

(52) U.S. Cl.
CPC .............. *F01D 25/24* (2013.01); *F16H 41/24* (2013.01); *F16H 45/02* (2013.01);
(Continued)

(58) Field of Classification Search
CPC .......... F01D 25/24; F16H 41/24; F16H 45/02; F03B 15/04
(Continued)

(56) References Cited

U.S. PATENT DOCUMENTS 5,259,191 A * 11/1993 Takino et al. ............ F16H 41/26
416/197 C
6,840,041 B2 * 1/2005 Okada et al. ............ F16H 41/26
416/197 C
(Continued)

FOREIGN PATENT DOCUMENTS

JP      05-050202 U    7/1993
JP      2008-075843 A    4/2008
(Continued)

*Primary Examiner* — Kevin Lee
(74) *Attorney, Agent, or Firm* — Sughrue Mion, PLLC (57) ABSTRACT

A vehicular fluid power transmitting device has a pump impeller, a turbine runner, damper device, an annular set member and a bearing assembly. The pump impeller has a pump shell. The damper device is provided between a drive source and the pump shell in an axial direction of an output shaft, and has a damper input member that is connected to the drive source, and a damper output member that is connected to the pump shell. The damper output member is connected to the annular set member that is fixed to the
(Continued)

pump shell. The damper input member is relatively rotatably supported via the bearing assembly by the annular set member.

2 Claims, 4 Drawing Sheets

(52) U.S. Cl.
CPC ........... *F16H 2045/0205* (2013.01); *F16H 2045/0252* (2013.01); *F16H 2045/0294* (2013.01)

(58) Field of Classification Search
USPC ..................................................... 416/197 C
See application file for complete search history.

(56) References Cited

U.S. PATENT DOCUMENTS

| | | | | |
|---|---|---|---|---|
| 2010/0178172 | A1* | 7/2010 | Yamashita | ............ F16H 41/26 416/197 C |
| 2011/0195795 | A1 | 8/2011 | Murata et al. | |

FOREIGN PATENT DOCUMENTS

| | | |
|---|---|---|
| JP | 2010-084852 A | 4/2010 |
| JP | 2010-255753 A | 11/2010 |

* cited by examiner

VEHICULAR FLUID POWER TRANSMITTING DEVICE

BACKGROUND OF THE INVENTION

1. Field of the Invention

The invention relates to a fluid power transmitting device provided in a vehicle.

2. Description of Related Art

A vehicular fluid power transmitting device provided in a power transmission path between a power source of a vehicle and an automatic transmission is known. This vehicular fluid power transmitting device transmits' torque generated by the power source to an input shaft of the automatic transmission via fluid. One known example of a vehicular fluid power transmitting device is a fluid coupling. A fluid coupling is provided with a pump impeller and a turbine runner. The pump impeller is rotatably driven about an axis by a drive source such as an engine. The turbine runner is rotated about this axis by operating fluid that is pushed out by the pump impeller. In Japanese Utility Model Application Publication No. 05-050202 (JP 05-050202 U) and Japanese Patent Application Publication No. 2010-084852 (JP 2010-084852 A), a torque converter is described as a vehicular fluid power transmitting device. The torque converter is provided with not only a pump impeller and a turbine runner, but also a stator that is arranged between the pump impeller and the turbine runner, in a manner rotatable about the axis.

In this kind of vehicular fluid power transmitting device, an input device such as a damper device or a drive plate that inputs torque from an engine that serves as the drive source of the vehicle to the pump impeller is fixed to a pump shell of the pump impeller by a plurality of set bolts. The plurality of set bolts are screwed into a plurality of set blocks that are fixed to the pump shell at predetermined intervals on the circumference of a circle by welding or the like.

One type of damper that may be used as the damper described above is a damper that has a damper shell that is a damper input member that is connected to the engine, a spring that is an elastic member that is housed in this damper shell, and a driven plate that is a damper output member that is connected to the pump shell. Furthermore, this damper may be provided with a bearing that positions the damper input member and the damper output member in the radial and axial directions. With this type of damper, when the driven plate is used for centering with respect to the torque converter, the damper input member that has a large mass is supported via the driven plate and the bearing. Therefore, the centering accuracy of the damper input member decreases, which is problematic. If the centering accuracy of the damper input member decreases in this way, the mass unbalance when the damper rotates will increase, causing the vehicle to vibrate.

SUMMARY OF THE INVENTION

The invention thus provides a vehicular fluid power transmitting device that improves centering accuracy of a damper input member that forms a damper.

One aspect of the invention relates to a vehicular fluid power transmitting device that includes a pump impeller, a turbine runner, and a damper device, an annular set member and a bearing assembly. The pump impeller has a plurality of pump blades inside of a pump shell to which torque from a drive source is input. The turbine runner has a plurality of turbine blades provided in positions opposite the pump blades, and a hub portion that supports the turbine blades. The turbine runner is supported by a shaft end portion of an output shaft, and is rotated by receiving operating fluid pushed out by the pump blades. The damper device is provided between the drive source and the pump shell in an axial direction of the output shaft, and has a damper input member that is connected to the drive source, an elastic member housed inside the damper input member, and a damper output member that is connected to the pump shell. The damper device suppresses pulsation of torque that is transmitted from the drive source to the pump shell. The damper output member is connected to the annular set member that is fixed to the pump shell. The damper input member is relatively rotatably supported via the bearing assembly by the annular set member.

According to the vehicular fluid power transmitting device structured in this way, the damper output member is fixed to the annular set member that is fixed to the pump shell, and the damper input member is relatively rotatably supported via the bearing assembly. Therefore, the damper input member is directly and rotatably supported by the annular set member that is fixed to the pump shell, via the bearing assembly. Here, the damper input member is a part that has a relatively large mass, among the parts that form the damper. Therefore, the centering accuracy of the damper input member is able to be increased, so vibration produced when the damper rotates is able to be suppressed.

In the aspect of the invention, the damper output member may have a radially outer portion to which torque from the damper input member is transmitted via the elastic member, and a radially inner portion that is fixed to an end surface on the drive source side of the annular set member in the axial direction. Furthermore, the damper input member may have a second radially outer portion within which the elastic member and the first radially outer portion are housed, and a cylindrical boss portion that is curved so as to reach farther toward a radially inner side of the radially inner portion. Also, the annular bearing may be fitted in between a radially outer surface of the cylindrical boss portion and a radially inner surface of the annular set member. Accordingly, the bearing assembly is provided on the radially inner side of the annular set member, so mounting space on the radially outer side of the annular set member can be ensured regardless of the plate thickness of the damper output member, and consequently, mountability of the damper can be increased.

In addition to the above configuration, the annular set member may have a plurality of female threaded holes into which a plurality of set bolts screw, and the plurality of female threaded holes may extend in the axial direction. Furthermore, the radially inner portion may be fastened to the annular set member by the set bolts. Also, the damper input member may have the through-holes that are opposite, in the axial direction, the set bolts. Accordingly, mounting space on the radially outer side of the annular set member can be ensured regardless of the plate thickness of the damper output member, so mountability of the damper can be increased.

In addition to the above configuration, the bearing assembly may be fitted to the radially inner surface of the annular set member, as well as fitted to a radially inner surface of the radially inner portion. Accordingly, the centering accuracy between the damper input member and the damper output member can be increased, so vibration of the vehicle can be even further suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings.

Figure 1:
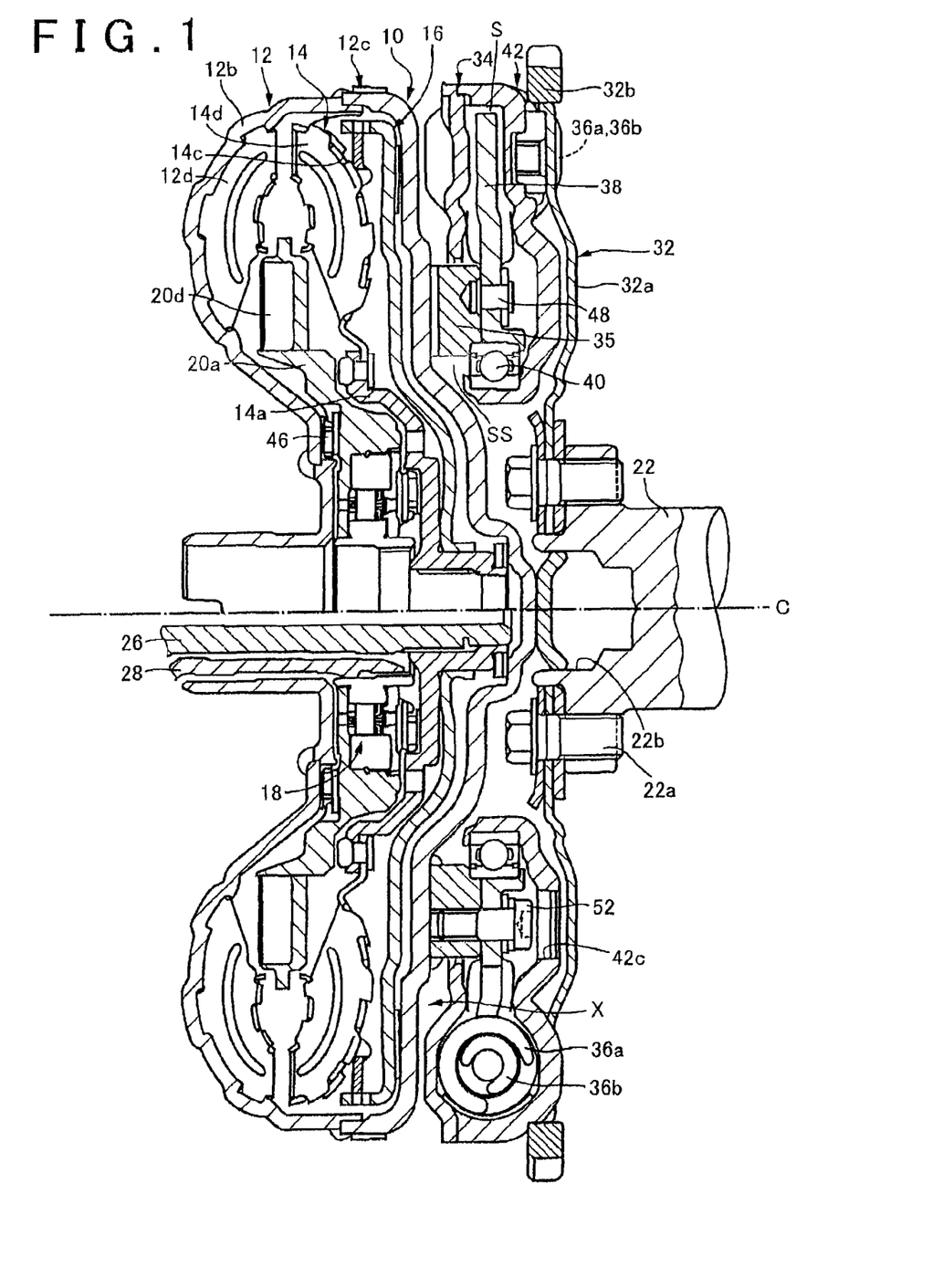
FIG. 1 is a sectional view of the structure of a vehicular torque converter according to one example embodiment of the invention.
Figure 2:
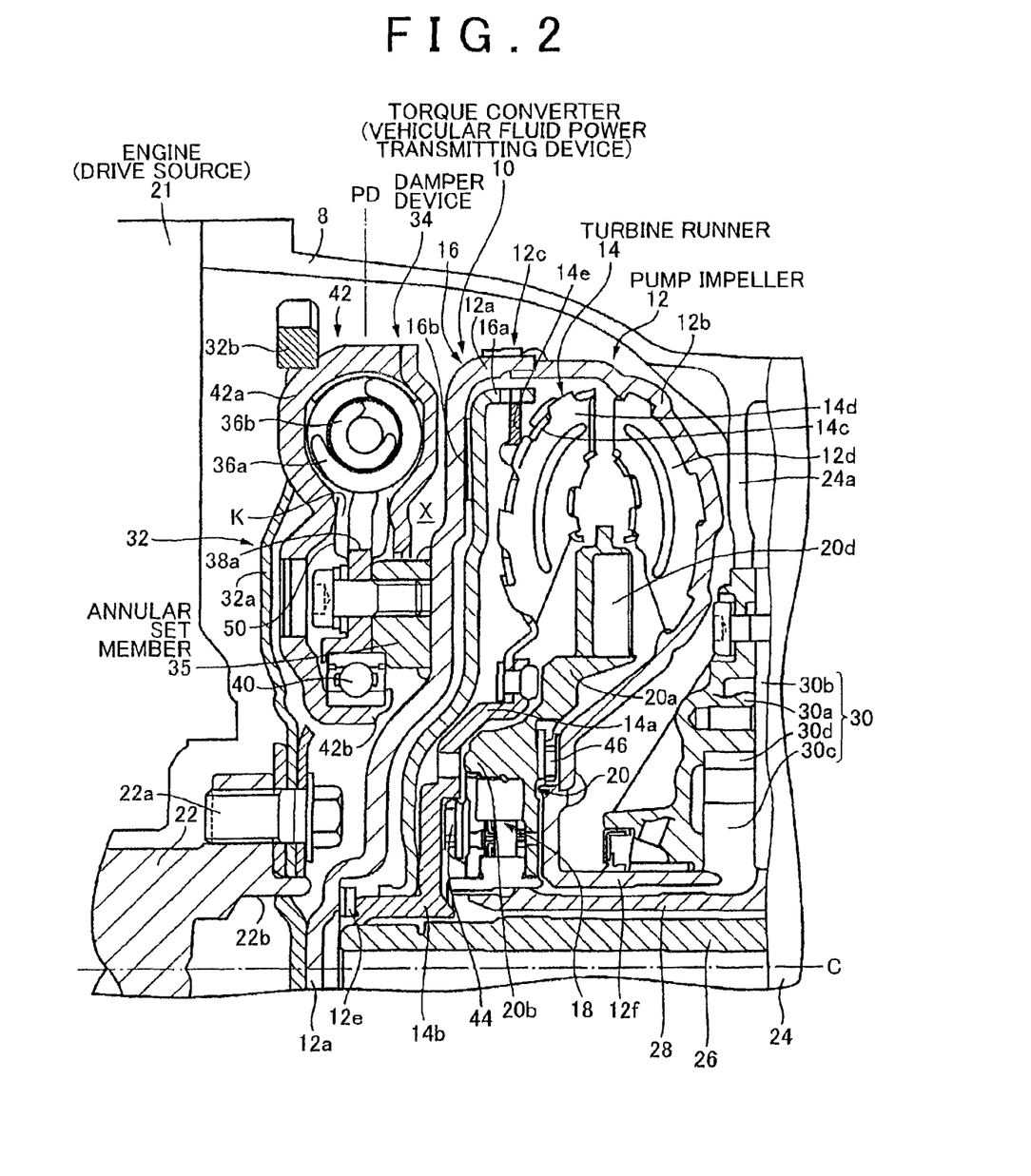
FIG. 2 is an enlarged view of the vehicular torque converter in FIG. 1 inside of a housing.

FIG. 1 is a sectional view of the structure of a torque converter 10 that is a vehicular fluid power transmitting device according to one example embodiment of the invention. FIG. 2 is an enlarged view of the vehicular torque converter in FIG. 1 inside of a housing, showing the torque converter 10 provided inside a cylindrical housing 8 of the vehicle. The torque converter 10 is provided with a pump impeller 12, a turbine runner 14, a lock-up clutch 16, a one-way clutch 18, and a stator 20. The torque converter 10 multiplies torque input from a crankshaft 22 of an engine 21 that serves as a drive source, and outputs the multiplied torque from an input shaft 26 of a transmission 24 that serves as an output shaft of the torque converter 10.

The pump impeller 12 includes a disc-shaped front shell 12a, a rear shell 12b, a pump shell 12c, and pump blades 12d. The pump shell 12c is connected to the crankshaft 22 of the engine 21 via a drive plate 32 and a damper device 34. Also, the pump shell 12c is rotated about an axis C at the same rotation speed as the crankshaft 22. The plurality of pump blades 12d are arranged overlapping each another in the circumferential direction inside of a radially outer portion of the rear shell 12b. The turbine runner 14 includes a disc-shaped hub portion 14a, a cylindrical shaft portion 14b, a turbine shell 14c, and turbine blades 14d. The disc-shaped hub portion 14a is spline-engaged with a shaft end portion of the input shaft 26, and is relatively rotatably abutted against the front shell 12a via a sliding ring 12e (i.e., abutted against the front shell 12a via the sliding ring 12e in a manner so as to be able to rotate relative to the front shell 12a). The cylindrical shaft portion 14b protrudes from the center of the hub portion 14a and is spline-engaged with the shaft end portion of the input shaft 26. The plurality of turbine blades 14d are fixed to a radially outer portion of the hub portion 14a, in a manner overlapping with each other in the circumferential direction and opposing the pump blades 12d. The turbine runner 14 is provided so as to rotate, together with the input shaft 26, about the axis C. The stator 20 includes a circular disc portion 20a and a circular cylindrical portion 20b. A radially outer portion of the circular disc portion 20a constitutes stator blades 20d. These stator blades 20d are positioned between the pump blades 12d of the pump impeller 12 and the turbine blades 14d of the turbine runner 14 in the axial direction of the input shaft 26. A radially inner portion of the stator 20 constitutes the circular cylindrical portion 20b. The circular cylindrical portion 20b is fitted with the one-way clutch 18. The stator 20 is rotatably supported about the axis C via the one-way clutch 18 by a cylindrical fixed shaft 28 that is a non-rotatable member that is fixed to the housing 8. Also, a first thrust bearing 44 on a front side is interposed between the stator 20 and the hub portion 14a of the turbine runner 14, and a second thrust bearing 46 on a rear side is interposed between the stator 20 and the rear shell 12b. Therefore, the position of the stator 20 in the direction of the axis C is determined. Here, the front side refers to the side that is relatively closer to the engine 21 in the direction along the axis C. Also, the rear side refers to the side that is relatively closer to the transmission 24 in the direction along the axis C. Also, the direction along the axis C may also be simply referred to as the "axial direction". That is, the axial direction of the output shaft of the torque converter 10 may also be regarded as the direction along the axis C.

A partition wall 24a is provided inside the housing 8. The partition wall 24a divides the housing 8 into a space in which the transmission 24 is housed and a space in which the torque converter 10 is housed. A hydraulic pump 30 is provided on this partition wall 24a. The hydraulic pump 30 includes a pump body 30a, a pump cover 30b, an inner ring gear 30c, and an outer ring gear 30d. The pump body 30a is fixed to the partition wall 24a. The pump cover 30b is fixed to the pump body 30a. The inner ring gear 30c and the outer ring gear 30d are rotatably housed in a space formed between the pump body 30a and the pump cover 30b, and are in mesh with each other. A shaft end of a cylindrical shaft 12f is engaged in a relatively non-rotatable manner with the inner ring gear 30c, i.e., in a manner so as not to be able to rotate relative to the inner ring gear 30c. The cylindrical shaft 12f is arranged radially inward of the rear shell 12b of the pump impeller and protrudes in the axial direction. As a result, the hydraulic pump 30 is rotatably driven by the engine 21. The hydraulic pump 30, i.e., the pump body 30a, protrudes out from the partition wall 24a in a conical shape in the axial direction toward the torque converter 10 side, i.e., the engine 21 side or the input side. The input shaft 26 protrudes out into the space in which the torque converter 10 is housed, and supports the torque converter 10, in a state rotatably supported by the partition wall 24a via a bearing, not shown.

The rear shell 12b of the pump impeller 12 constitutes a portion of the pump impeller 12 on the output side of the pump shell 12c, i.e., on the side that is relatively close to the transmission 24 in the axial direction. Also, the front shell 12a constitutes a portion of the pump impeller 12 on the input side of the pump shell 12c, i.e., on the side that is relatively close to the engine 21 in the axial direction. Hereinafter, when not specifically stated, the output side or the transmission 24 side refers to the side relatively close to the transmission 24 in the axial direction. Similarly, when not specifically stated, the input side or the engine 21 side refers to the side relatively close to the engine 21 in the axial direction. The radially outer portion of the rear shell 12b and the radially outer portion of the front shell 12a are offset so as to protrude toward the output side of the pump shell 12c, i.e., the transmission 24 side. Therefore, the radially inner portion of the rear shell 12b is concave-shaped toward the input side and receives a tip end portion of the pump body 30a. That is, the tip end portion of the pump body 30a overlaps in the radial direction with the radially outer portion of the rear shell 12b. As a result, space is able to be utilized efficiently, so the dimension of the torque converter 10 in the direction of the axis C is short.

The pump blades 12d are also offset toward the output side. Here, the pump blades 12d are arranged on an inside wall surface of the radially outer portion of the rear shell 12b that protrudes toward the transmission 24 side. Therefore, the stator blades 20d and the turbine blades 14d are also similarly offset toward the output side, i.e., the transmission 24 side, while maintaining a constant relative positional relationship with the pump blades 12d. In this example embodiment, the circular disc portion 20a of the stator 20 is formed in a conical shape. The radially outer portion of the circular disc portion 20a is positioned closer to the transmission 24 than the circular cylindrical portion 20b in the axial direction. Accordingly, the stator blades 20d are offset toward the output side of the torque converter 10 so as not to overlap in the radial direction with the one-way clutch 18. Also, the hub portion 14a of the turbine runner 14 is formed in a conical shape. The radially outer portion of the hub portion 14a overlaps in the radial direction with the one-way clutch 18. Therefore, the turbine blades 14d are offset toward the output side such that a portion of the turbine blades 14d does not overlap in the radial direction with the one-way clutch 18, and a portion of the turbine blades 14d does overlap in the radial direction with the one-way clutch 18.

The lock-up clutch 16 includes a circular disc-shaped piston 16a and an annular friction element 16b. The radially center portion of the piston 16a is slidably engaged with the radially outer surface of the cylindrical shaft portion 14b that protrudes from the radially inner portion of the hub portion 14a of the turbine runner 14. The hub portion 14a is relatively non-rotatably engaged with the shaft end portion of the input shaft 26. Also, the piston 16a is relatively non-rotatably engaged with an engaging protrusion 14e that protrudes from the turbine shell 14c. The annular friction element 16b is fixed to radially outer portion of the piston 16a, or a portion of the inside of the front shell 12a opposing the radially outer portion of the piston 16a. The annular friction element 16b directly connects the turbine runner 14 and the pump impeller 12 to each other by frictional force. The radially outer portion of the front shell 12a constitutes a portion of the pump shell 12c that is relatively close to the input side of the pump shell 12c, i.e., the engine 21 side in the axial direction. In this configuration, the radially outer portion of the front shell 12a is offset so as to protrude toward the output side, i.e., the transmission 24 side in the axial direction. Therefore, the radially outer portion of the piston 16a is also similarly offset so as to protrude toward the output side, i.e., the transmission 24 side in the axial direction, thus preventing interference with the front shell 12a and the turbine runner 14. In this way, the radially outer portions of the front shell 12a and the piston 16a of the lock-up clutch 16 are offset toward the output side in the axial direction, such that the radially outer portion of the piston 16a and the friction element 16b that is fixed thereto overlap in the radial direction with the one-way clutch 18.

The drive plate 32 that is fixed to the shaft end of the crankshaft 22 of the engine 21 includes a circular disc-shaped portion 32a and a ring gear 32b. The ring gear 32b is fixed to a radially outer portion of the circular disc-shaped portion 32a so as to be in mesh with a pinion of a stator motor, not shown. The damper device 34 is provided between this drive plate 32 and the front shell 12a that forms a front portion of the pump shell 12c.

The damper device 34 includes a circular disc-shaped driven plate 38 and a damper shell 42. A radially inner portion of the driven plate 38 is fixed to the front shell 12a via a ring-shaped annular set member 35 that is concentric with the axis C. Also, notches 38a are formed in a plurality of locations at equidistant intervals in the radially outer portion of the driven plate 38. The notches 38a are open to the radially outer side so as to receive two types of damper springs, i.e., a large damper spring 36a and a small damper spring 36b. The large damper spring 36a and the small damper spring 36b are wound in coil-shapes such that the circumferential direction of the damper device 34 is a longitudinal direction of the large damper spring 36a and the small damper spring 36b, and are concentric with each other. The damper shell 42 is rotatably supported about the axis C via an annular bearing 40 by the annular set member 35 that is fixed to the front shell 12a, as well as fixed to the circular disc-shaped portion 32a of the drive plate 32. Also, the damper shell 42 includes circular columnar-shaped spaces that extend in the circumferential direction for receiving the pair of damper springs, i.e., the large damper spring 36a and the small damper spring 36b, so as to cover the outer peripheries thereof. These circular columnar-shaped spaces are formed in a plurality of locations at equidistant intervals in the circumferential direction. Pulsation of torque transmitted from the engine 21 is absorbed by the large damper spring 36a and the small damper spring 36b contracting in the circumferential direction, i.e., the longitudinal direction thereof, in response to an offset in the rotational phase between the driven plate 38 and the damper shell 42. In this example embodiment, the damper shell 42 serves as a damper input member, the driven plate 38 serves as a damper output member, the annular bearing 40 serves as a bearing assembly, and the large damper spring 36a and the small damper spring 36b each serve as an elastic member.

Of the parts that make up the damper device 34, the damper shell 42 has the largest mass. The damper shell 42 is relatively rotatably supported via the annular bearing 40 by the annular set member 35 that is fixed to the front shell 12a, such that the centering accuracy of this damper shell 42 is increased and vibration produced during rotation is consequently suppressed. That is, the driven plate 38 is housed inside the damper shell 42, and has a radially outer portion to which torque from the damper shell 42 is transmitted via the large damper spring 36a and the small damper spring 36b, and a radially inner portion that is fixed to an end surface on the drive source side of the annular set member 35. The damper shell 42 has a radially outer portion 42a and a cylindrical boss portion 42b. The radially outer portion 42a houses the large damper spring 36a, the small damper spring 36b, and the radially outer portion of the driven plate 38. The cylindrical boss portion 42b is curved so as to reach farther toward a radially inner side than the radially inner portion of the driven plate 38. The annular bearing 40 is fitted in between the radially outer surface of the cylindrical boss portion 42b and the radially inner surface of the annular set member 35. Also, an outer race of this annular bearing 40 is also fitted to the radially inner surface of the radially inner portion of the driven plate 38, so the centering accuracy between the damper shell 42 and the driven plate 38 is also increased. Further, the radially inner portion of the driven plate 38 is fastened to the annular set member 35 by set bolts 52. The damper shell 42 has through-holes 42c that are opposite, in the axial direction, the set bolts 52. A tool for fastening the set bolts 52 passes through the through-holes 42c. This kind of structure ensures mounting space on the radially outer side of the annular set member 35 regardless of the plate thickness of the driven plate 38, and thus increases mountability of the damper device 34. In this example embodiment, the radially outer portion of the driven plate 38 serves as a first radially outer portion, and the radially outer portion of the damper shell 42 serves as a second radially outer portion.

The damper shell 42 is provided with a spring housing space S and a radially inner side opening K. The spring housing space S includes the plurality of circular columnar spaces described above and a communication space that communicates the plurality of circular columnar spaces with each other in the circumferential direction. The opening width in the axial direction of the radially inner side opening K is smaller than the diameter of the large damper spring 36a. Also, the radially inner side of the communication space is open to the radially inner side opening K. The radially outer portion of the driven plate 38 is fit into this opening K. Also, a pair of spring steel seal members 50 that is fixed by rivets 48 on both sides of the driven plate 38 seals this opening K. A lubricant such as grease, for example, is filled into the spring housing space S.

As described above, the radially outer portion of the front shell 12a that constitutes the input side portion, i.e., the engine 21 side portion, of the pump shell 12c is offset so as to protrude toward the output side, i.e., the transmission 24 side. Therefore, an annular space X is formed between the radially outer portion of the front shell 12a and the drive plate 32, on the input side of the front shell 12a, i.e., on the engine 21 side. The damper device 34 is arranged in this annular space X. A center position PD of the damper device 34 in the direction of the axis C is positioned farther to the output side than the shaft end of the input shaft 26. The center position PD passes through the center of the large damper spring 36a and the small damper spring 36b. Also, the center position PD is positioned farther to the output side than an end surface of the input side of the cylindrical shaft portion 14b that is positioned on the radially inner portion of the turbine runner 14. Furthermore, the center position PD is positioned farther to the output side than a tip end on the input side of the radially inner portion of the front shell 12a. As is evident from this, the damper device 34 is positioned so as to overlap in the radial direction with the shaft end portion of the input shaft 26, the radially inner portion of the turbine runner 14, i.e., the cylindrical shaft portion 14b, and the radially inner portion of the front shell 12a. Accordingly, the radially inner portion of the front shell 12a that constitutes the input side portion of the pump shell 12c protrudes farther toward the input side, i.e., the engine 21 side, than the radially outer portion of the front shell 12a, and overlaps with almost the entire damper device 34 in the radial direction.

As a result, with the damper device 34, the large damper spring 36a and the small damper spring 36b are positioned on the radially outer side, so the coil diameter and the coil wire diameter can both be larger than they can be with the related art. Thus, the damper device 34 has good flexible damper performance, with a large torsion angle with respect to a change in torque. As a result of the damper device 34 having such good damper performance, torque vibration is able to be effectively reduced, so the engine 21 can be operated in a low speed, high load operating range with good combustion efficiency. Also, when running in a locked-up (i.e., direct drive) state by the lock-up clutch 16, the torque converter 10 is supported by the input shaft 26 via the piston 16a and the turbine runner 14. At this time, the damper device 34 overlaps with the input shaft 26, so when a disturbance such as vibration is input, vibration of the damper device 34 is suppressed. Thus, the damper device 34 is able to be even more stably supported. Also, as described above, the damper device 34 is positioned such that the center position PD in the direction of the axis C overlaps in the radial direction with the shaft end of the input shaft 26 and the cylindrical shaft portion 14b of the turbine runner 14. Therefore, good operability is able to be achieved during assembly when supporting the torque converter 10 and fitting the one-way clutch 18 and the input shaft 26.

Figure 3:
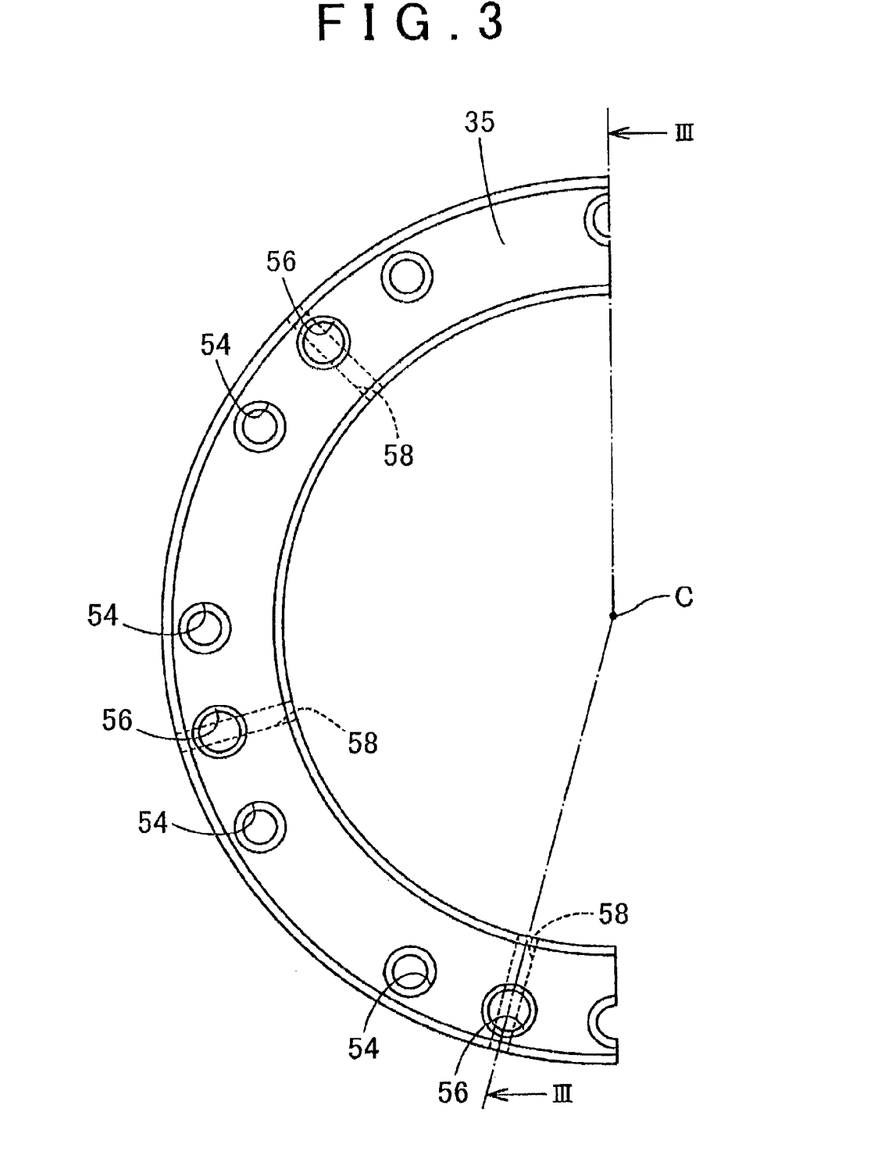
FIG. 3 is a front view showing the structure of an annular set member that is fixed to a pump shell of the vehicular torque converter in FIG. 1, in which half of the annular set member has been cut away.
Figure 4:
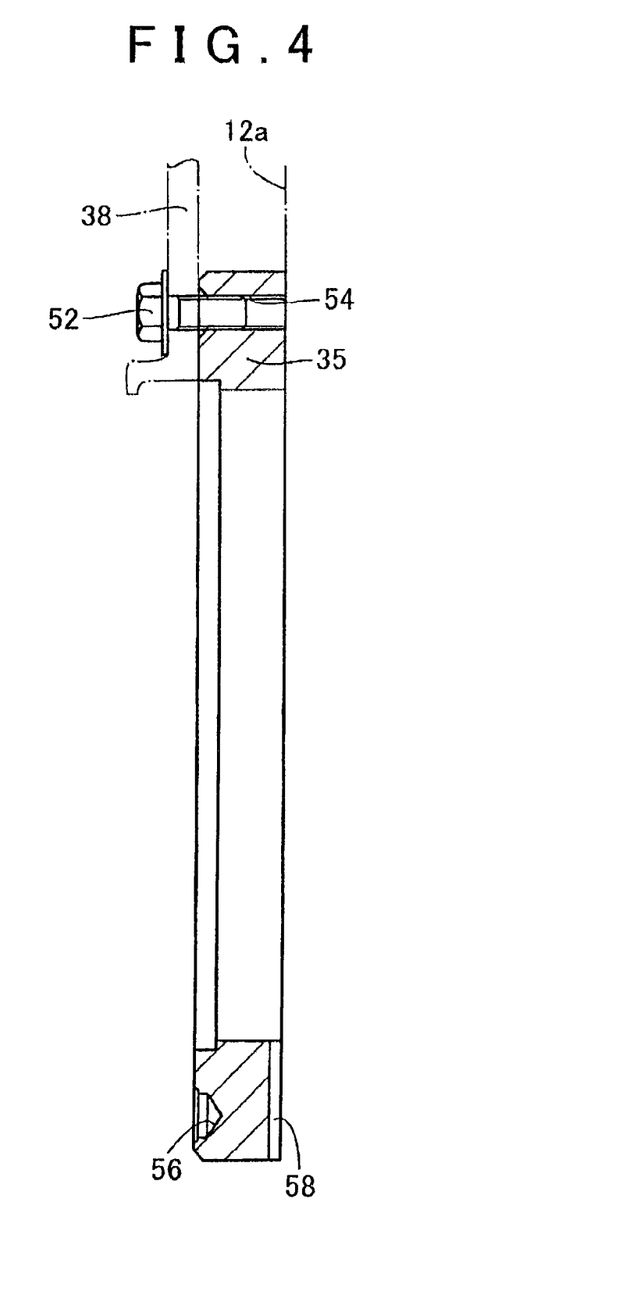
FIG. 4 is a sectional view taken along line III-III in FIG. 3, illustrating a through-groove formed in the annular set member.

FIG. 3 is a front view, from the engine 21 side, of the annular set member 35 that is fixed to the front shell 12a by welding or the like. FIG. 4 is a sectional view taken along line III-III in FIG. 3 of a cross section of the annular set member 35. In FIGS. 3 and 4, a plurality of female threaded holes 54 are formed in (i.e., through) the annular set member 35 to fix the driven plate 38 to the front shell 12a. The set bolts 52 that pass through the driven plate 38 are screwed into the female threaded holes 54. Also, a plurality of interference preventing holes 56 for preventing interference with the rivets 48 are formed as blind holes in the annular set member 35. Also, through-grooves 58 that extend through in the radial direction are formed in the surface on the front shell 12a side of the annular set member 35. The through-grooves 58 are formed in positions where the interference preventing holes 56 are formed. In this configuration, an annular space SS is formed by being surrounded by the radially inner surface of the annular set member 35, the annular bearing 40, and the front shell 12a, and opens to the radially inner side. These through-grooves 58 serve as communication paths that discharge water collected in the annular space SS to the radially outer side by centrifugal force or gravity.

As described above, according to the torque converter 10 of this example embodiment, in the damper device 34, the damper shell 42 that has the largest mass of all of the parts that make up the damper device 34 is relatively rotatably supported via the annular bearing 40 by the annular set member 35 that is fixed to the front shell 12a. Therefore, the centering accuracy of the damper shell 42 is increased, so vibration produced during rotation is able to be suppressed.

Also, with the torque converter 10 of this example embodiment, the driven plate 38 includes the radially outer portion that is housed inside the damper shell 42, and the radially inner portion that is fixed to the end surface on the drive source side of the annular set member 35. Torque from the damper shell 42 is transmitted via the large damper spring 36a and the small damper spring 36b to the radially outer portion of the driven plate 38. The damper shell 42 includes the radially outer portion 42a and the cylindrical boss portion 42b. The radially outer portion 42a houses the large damper spring 36a, the small damper spring 36b, and the radially outer portion of the driven plate 38, The cylindrical boss portion 42b is curved so as to reach farther toward the radial inside than the radially inner portion of the driven plate 38. Also, the annular bearing 40 is fitted in between the radially outer surface of the cylindrical boss portion 42b and the radially inner surface of the annular set member 35. In this way, the annular bearing 40 is provided on the radially inner side of the annular set member 35. As a result, mounting space on the radially outer side of the annular set member 35 can be ensured regardless of the plate thickness of the driven plate 38, so mountability of the damper can be increased.

Also, according to the torque converter 10 of this example embodiment, the plurality of female threaded holes 54 that the plurality of set bolts 52 screw into are formed in the direction of the axis C in the annular set member 35. The radially inner portion of the driven plate 38 is fastened to the annular set member 35 by the set bolts 52. Also, the damper shell 42 has the through-holes 42c that are opposite the set bolts 52. Therefore, mounting space on the radially outer side of the annular set member 35 can be ensured regardless of the plate thickness of the driven plate 38, so mountability of the damper device 34 can be increased.

Also, according to the torque converter 10 of this example embodiment, the annular bearing 40 is fitted to the radially inner surface of the annular set member 35, as well as fitted to the radially inner surface of the radially inner portion of the driven plate 38. Therefore, the centering accuracy between the damper shell 42 and the driven plate 38 is able to be increased, so vibration of the vehicle is able to be further suppressed.

While example embodiments of the invention have been described in detail with reference to the drawings, the invention may also be applied in other modes.

For example, in the example embodiment described above, the torque converter 10 is given as one example of the vehicular fluid power transmitting device, but the vehicular fluid power transmitting device may also be a fluid coupling.

Further, in the example embodiment described above, the annular bearing 40 that is formed by a ball bearing is used as the bearing assembly, but it may also be formed by a metal bearing or a roller bearing or the like.

Also, in the example embodiment described above, the damper device 34 has two types of damper springs, i.e., the large damper spring 36a and the small damper spring 36b, but it may also have one type or three types of damper springs. Also, the damper device 34 may have another structure or shape, e.g., the sizes and/or positions of the damper springs may be different.

Further, in the example embodiment described above, the blades 12d of the pump impeller 12, the blades 14d of the turbine runner 14, and the blades 20d of the stator 20 are offset toward the output side. However, the offset amount does not necessarily have to be such that the blades 20d of the stator 20 are offset to a position where they do not overlap with the one-way clutch 18.

The example embodiments and modes described above are merely examples. The invention may be carried out in modes that have been modified or improved in any of a variety of ways based on the knowledge of one skilled in the art.

The invention claimed is:

1. A vehicular fluid power transmitting device comprising:
    a pump impeller that has a plurality of pump blades inside of a pump shell to which torque from a drive source is input;
    a turbine runner that has a plurality of turbine blades provided in positions opposite the pump blades, and a hub portion that supports the turbine blades, the turbine runner supported by a shaft end portion of an output shaft and rotated by receiving operating fluid pushed out by the pump blades;
    a damper device that is provided between the drive source and the pump shell in an axial direction of the output shaft, has a damper input member, an elastic member and a damper output member, and suppresses pulsation of torque transmitted from the drive source to the pump shell, the damper input member connected to the drive source, the elastic member housed inside the damper input member, and the damper output member connected to the pump shell;
    an annular set member to which the damper output member is connected, the annular set member fixed to the pump shell; and
    a bearing assembly via which the damper input member is relatively rotatably supported by the annular set member, wherein:
    the damper output member has a first radially outer portion and a radially inner portion;
    torque from the damper input member is transmitted to the first radially outer portion via the elastic member;
    the radially inner portion is fixed to an end surface, on a drive source side, of the annular set member in the axial direction;
    the damper input member has a second radially outer portion and a cylindrical boss portion;
    the elastic member and the first radially outer portion are housed within the second radially outer portion;
    the cylindrical boss portion is curved so as to reach farther toward a radially inner side than the radially inner portion;
    the bearing assembly is fitted in between a radially outer surface of the cylindrical boss portion and a radially inner surface of the annular set member; and
    the bearing assembly is fitted to the radially inner surface of the annular set member, as well as fitted to a radially inner surface of the radially inner portion.

2. The vehicular fluid power transmitting device according to claim 1, wherein:
    the annular set member has a plurality of female threaded holes into which a plurality of set bolts screw;
    the plurality of female threaded holes extend in the axial direction;
    the radially inner portion is fastened to the annular set member by the set bolts; and
    the damper input member has through-holes that are opposite, in the axial direction, the set bolts.

* * * * *